United States Patent
Pellikka

(10) Patent No.: US 10,025,492 B2
(45) Date of Patent: Jul. 17, 2018

(54) POINTING DETECTION

(71) Applicant: Microsoft Technology Licensing, LLC, Redmond, WA (US)

(72) Inventor: Matti Pellikka, Lempäälä (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/018,848

(22) Filed: Feb. 8, 2016

(65) Prior Publication Data

US 2017/0228124 A1    Aug. 10, 2017

(51) Int. Cl.
| | | |
|---|---|---|
| G06F 3/041 | (2006.01) | |
| G06F 3/0488 | (2013.01) | |
| G06F 3/0354 | (2013.01) | |

(52) U.S. Cl.
CPC ........ G06F 3/0488 (2013.01); G06F 3/03545 (2013.01); G06F 3/03547 (2013.01); G06F 3/0416 (2013.01)

(58) Field of Classification Search
CPC .. G06F 3/03545; G06F 3/03547; G06F 3/041; G06F 3/0416; G06F 3/044; G06F 3/045; G06F 3/048; G06F 3/0488; G06F 2203/04101; G06F 2203/04108
See application file for complete search history.

(56) References Cited

U.S. PATENT DOCUMENTS

| | | | | |
|---|---|---|---|---|
| 5,825,352 A * | 10/1998 | Bisset | ..................... | G06F 3/044 345/157 |
| 6,256,038 B1 * | 7/2001 | Krishnamurthy | ..... | G06T 11/203 345/419 |
| 6,271,856 B1 * | 8/2001 | Krishnamurthy | ....... | G06T 17/30 345/581 |
| 6,498,602 B1 * | 12/2002 | Ogawa | ................ | G06F 3/03545 178/18.01 |
| 7,574,020 B2 * | 8/2009 | Shamaie | ............ | G06K 9/00355 345/594 |
| 9,007,331 B2 | 4/2015 | Sobel et al. | | |

(Continued)

FOREIGN PATENT DOCUMENTS

| | | |
|---|---|---|
| CN | 102622601 A | 8/2012 |
| WO | 2014174772 A1 | 10/2014 |

OTHER PUBLICATIONS

Wang, et al., "Detecting and Leveraging Finger Orientation for Interaction with Direct-Touch Surfaces", In Proceedings of the 22nd annual ACM symposium on User interface software and technology, Oct. 4, 2009, pp. 23-33.

(Continued)

*Primary Examiner* — Joe H Cheng

(57) ABSTRACT

A pointing detecting device is described. In an embodiment, a device comprises: a display; a processor; a storage containing instructions; wherein the instructions cause the processor to: select a set of points from a point cloud representing a pointing object in proximity or in contact of the display; determine the selected set of points as control points of a computational smooth surface representing the pointing object; determine a point nearest to the display on the computational smooth surface; based on the point nearest to the display, determine a point in a direction of a gradient of a curvature of the computational smooth surface; and report the point as a location of a desired pointing or touch action.

20 Claims, 6 Drawing Sheets

(56) References Cited

U.S. PATENT DOCUMENTS

| | | | |
|---|---|---|---|
| 2003/0197688 A1* | 10/2003 | Aufderheide | G06F 3/045 345/173 |
| 2004/0021633 A1* | 2/2004 | Rajkowski | G06F 3/0233 345/156 |
| 2006/0244733 A1 | 11/2006 | Geaghan | |
| 2006/0244735 A1 | 11/2006 | Wilson | |
| 2007/0160282 A1* | 7/2007 | Nightingale | G01N 23/046 382/152 |
| 2007/0285404 A1 | 12/2007 | Rimon et al. | |
| 2008/0012835 A1 | 1/2008 | Rimon et al. | |
| 2008/0246758 A1* | 10/2008 | Strassenburg-Kleciak | G06T 17/20 345/419 |
| 2008/0309632 A1* | 12/2008 | Westerman | G06F 3/038 345/173 |
| 2009/0146968 A1* | 6/2009 | Narita | G06F 3/0416 345/173 |
| 2009/0278798 A1 | 11/2009 | Kim et al. | |
| 2010/0071965 A1* | 3/2010 | Hu | G06F 3/044 178/18.06 |
| 2011/0080430 A1* | 4/2011 | Nishibe | G06F 3/04883 345/661 |
| 2011/0090381 A1* | 4/2011 | Cote | G06T 3/4015 348/246 |
| 2012/0038742 A1* | 2/2012 | Robinson | H04N 7/142 348/14.16 |
| 2012/0206377 A1 | 8/2012 | Zhao et al. | |
| 2013/0057650 A1* | 3/2013 | Song | G01B 11/2527 348/46 |
| 2013/0257748 A1* | 10/2013 | Ambrus | G02B 27/0093 345/173 |
| 2013/0273968 A1* | 10/2013 | Rhoads | G06F 17/30244 455/556.1 |
| 2014/0104169 A1* | 4/2014 | Masselli | G01B 11/00 345/157 |
| 2014/0108915 A1* | 4/2014 | Lu | G06F 17/2247 715/234 |
| 2014/0125614 A1* | 5/2014 | Koepcke | G06F 3/0416 345/173 |
| 2014/0184558 A1* | 7/2014 | Midholt | G06F 3/041 345/174 |
| 2014/0313136 A1* | 10/2014 | Kratz | G06F 3/0425 345/173 |
| 2014/0354602 A1 | 12/2014 | He et al. | |
| 2015/0077338 A1* | 3/2015 | Dai | G06F 3/0488 345/157 |
| 2015/0109257 A1 | 4/2015 | Jalali | |
| 2015/0242107 A1 | 8/2015 | Chen et al. | |
| 2016/0171765 A1* | 6/2016 | Mehr | G06F 17/11 345/419 |
| 2016/0231865 A1* | 8/2016 | Harrison | G06T 7/73 |
| 2016/0306496 A1* | 10/2016 | Ishikawa | G06F 3/044 |
| 2016/0364007 A1* | 12/2016 | Kamovich | G06F 3/0488 |

OTHER PUBLICATIONS

Kratz, et al., "PointPose: Finger Pose Estimation for Touch Input on Mobile Devices using a Depth Sensor", In Proceedings of the ACM International Conference on Interactive Tabletops and Surfaces, Oct. 6, 2013, 8 pages.

Moeller, et al., "ZeroTouch: An Optical Multi-Touch and Free-Air Interaction Architecture", In Proceedings of Conference on Human Factors in Computing Systems, May 5, 2012, pp. 2165-2174.

Taylor, et al., "Type—Hover—Swipe in 96 Bytes: A Motion Sensing Mechanical Keyboard", In Proceedings of the SIGCHI Conference on Human Factors in Computing Systems, Apr. 26, 2014, 11 pages.

Westerman, Wayne, "Hand Tracking, Finger Identification, and Chordic Manipulation on a Multi-Touch Surface", In PhD Thesis of University of Delaware, Jan. 1999, 363 pages.

Borman, et al., "The Method of Fundamental Solutions for Detection of Cavities in EIT", In Journal of Integral Equations Applications, vol. 21, Issue 3, Jul. 22, 2009, pp. 381-404.

Grinfeld, Pavel, "Introduction to Tensor Analysis and the Calculus of Moving Surfaces", In Publication of Springer, Oct. 2013, 303 pages.

Sullivan, John M., "Curvature Measures for Discrete Surfaces", In Proceedings of ACM SIGGRAPH, Jul. 31, 2005, 4 pages.

Piegl, et al., "The NURBS Book, Monographs in Visual Communication", In Publication of Springer, Nov. 14, 1996, 330 pages.

Rogers, et al., "AnglePose: Robust, Precise Capacitive Touch Tracking via 3D Orientation Estimation", In the Proceedings of the SIGCHI Conference on Human Factors in Computing Systems, May 7, 2011, pp. 2575-2584.

"International Search Report and Written Opinion Issued in PCT Application No. PCT/US2017/015704", dated Apr. 11, 2017, 19 Pages.

Choi, et al., "Matrix Representation for Nurb Curves and Surfaces", In the Journal of Computer Aided Design, vol. 22, Issue 4, May 4, 1990, pp. 235-240.

* cited by examiner

POINTING DETECTION

BACKGROUND

Various electronic devices may comprise a touch screen as an input or output device. Touch screens may be of various types using various technologies to detect touch actions of a user. A user may use their fingers or, for example, a stylus as a pointing object. Some technologies, which may be used to detect a touch or a hovering action, include capacitive touch screen technology, resistive touch screen technology, optical or infra-red imaging, acoustic wave technologies, inductive touch screen technologies, etc. It may be possible to develop a point cloud representing an object touching or hovering over a touch screen. Touch or hovering actions may be used as inputs to a graphical user interface, GUI.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A pointing detecting device is described. In an embodiment, a device comprises: a display; a processor; a storage containing instructions; wherein the instructions cause the processor to: select a set of points from a point cloud representing a pointing object in proximity or in contact of the display; determine the selected set of points as control points of a computational smooth surface representing the pointing object; determine a point nearest to the display on the computational smooth surface; based on the point nearest to the display, determine a point in a direction of a gradient of a curvature of the computational smooth surface; and report the point as a location of a desired pointing or touch action.

In other embodiments, a device and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of devices comprising a touchscreen, for example, tablets, phablets, smartwatches, portable computers, game consoles, game controllers, touch screen TVs, e-book readers, information dashboards/kiosks, electronic signage, ATMs, etc., wherein the device determines a location of a pointing or touching action.

Although the embodiments may be described and illustrated as being implemented in a touchscreen, this is also only an example implementation and not a limitation. A touch sensitive element, which might not include a display, may be used as well. The touch sensitive element may be configured to detect a touching action on the element or a hovering action hover over it.

The term 'computer', 'computing device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing device' each include PCs, servers, mobile telephones (including smart phones), tablet or phablet computers, e-Book readers, set-top boxes, media players, games consoles, personal digital assistants, information display systems, smart TVs and many other devices.

Figure 1A:
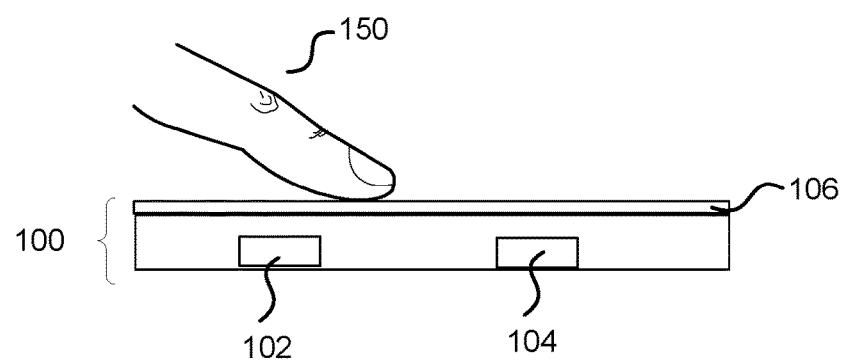
FIG. 1a and FIG. 1b illustrate schematic representations of a device and a pointing object touching the device according to an embodiment.

FIG. 1a illustrates a pointing object such as a finger 150 touching a touchscreen 106 of a device 100, according to an embodiment. Device 100 may comprise the touchscreen 106, a processor 102 and a storage 104. Storage 104 may contain instructions executable by processor 102. An embodiment improves the accuracy of detecting a touch action, a pointing action or a hovering action, for example the accuracy of the point that a user intends to touch or point. More accurate touch detection provides an improved user experience in using the touchscreen 106. A tip of the pointing object may be detected representing the intended touch or point. According to an embodiment a direction of the pointing object may be determined. According to an embodiment, an elevation angle of the pointing object may be determined. The intended touch or hover, the tip, the direction and the elevation angle may improve the user experience and enable further actions in different applications for the device 100.

Referring to FIG. 1a, the finger 150 may be either touching the touchscreen 106 or hovering over it. A point cloud representing the finger 150 may be developed by the processor 102. The method and configuration used to obtain the point cloud may depend upon the design and technology used in touchscreen 106. Storage 104 may contain instructions which cause the processor 102 to perform the actions described herein. The processor may select a set of points from the point cloud as control points of a smooth surface, which is anchored to lie close to the set of points. When the point cloud represents the finger, the set of points also represents the finger 150. The smooth surface is a computational surface, which is obtained from the set of points. It is smooth so that it is anchored to lie close to the selected set of points. The computational smooth surface represents the pointing object such as the finger 150. It may be a computational model representing the pointing object such as the finger 150. According to an embodiment this is a non-uniform B-spline, NURBS, surface. According to an embodiment, the NURBS surface may be obtained by tensor product of two NURBS curves. A NURBS curve is a representation of a curve in parametric form. The shape of a NURBS surface may be determined by control points. The processor may compute minima of the NURBS surface by Newton's method. The minima may represent the point closest to the touchscreen 106. Further, on the NURBS surface a point of maximum Gaussian curvature may be found by the processor 102. The processor 102 may then report a point between the minima and the point of maximum Gaussian curvature as the point of an intended touch or hovering action by a user. Also at the minima, the processor may develop a matrix of second derivatives in a direction perpendicular to the touch screen and compute its eigenvalues, reporting the eigenvector corresponding to the larger eigenvalue as the azimuthal angle. The direction of the finger 150 may be resolved by using the gradient of Gaussian curvature of the NURBS surface. Further the elevation angle may be determined by the processor from the ratio of eigenvalues; less elevation corresponding to a ratio closer to 1. Furthermore, the shape of the finger 150 touching or lying on the touchscreen 106 may be determined.

According to an embodiment, processor 102 and storage 104 may be configured to determination and reporting of touch related information only, for example, processor 102 and storage 104 may comprise a touch controller. According to an embodiment, a point between minima of the NURBS surface and the point of maximum Gaussian curvature may be a more accurate representation of the point where the user intended to perform a touch or hover action, for example this may be a fingertip or a tip of the stylus. According to an embodiment, the relative distance between the point selected as the location of intended touch or hover action and the minima in NURBS surface and/or the point of maximum Gaussian curvature may be based on either on empirical data, learned by, for example, machine learning, or calibration by a user. According to an embodiment, the processor may find and report the intended location of a touch or a hover action and orientation information in real time. Furthermore, the shape of the surface of the object touching the touchscreen 106 may be found and reported in real time. According to an embodiment, in response to a reported touch location, orientation or elevation, an action may be carried out in device 100. Determining accurate location of touch and additional information about a pointing object may improve user experience. Furthermore, this may be performed in a real time so that the user of the device 100 experiences the detection in real time.

Figure 1B:
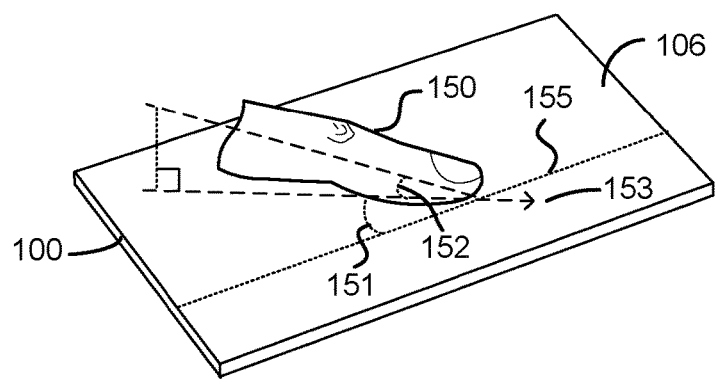

FIG. 1b illustrates a finger 150 touching a touchscreen 106 of a device 100 and the angles 151, 152 involved that may be needed to specify the direction and orientation of the finger according to an embodiment. Referring to FIG. 1b, when a finger touches or hovers over a touchscreen, it may do so at an angle 151 with respect a reference line 155 parallel to an edge of the touchscreen 106. According to an embodiment, this angle may be used to specify the direction 153 of the finger 150. Furthermore, a finger 150 may touch a touchscreen 106 at an angle of elevation 152 with respect to the surface of the touch screen 106. According to an embodiment, knowledge of angle of elevation 152 and azimuthal angle 151 of a finger 150 at the time it touches a touch screen may be used in conjunction with location of the touch incident for improved user interfaces and/or user experience.

Figure 2:
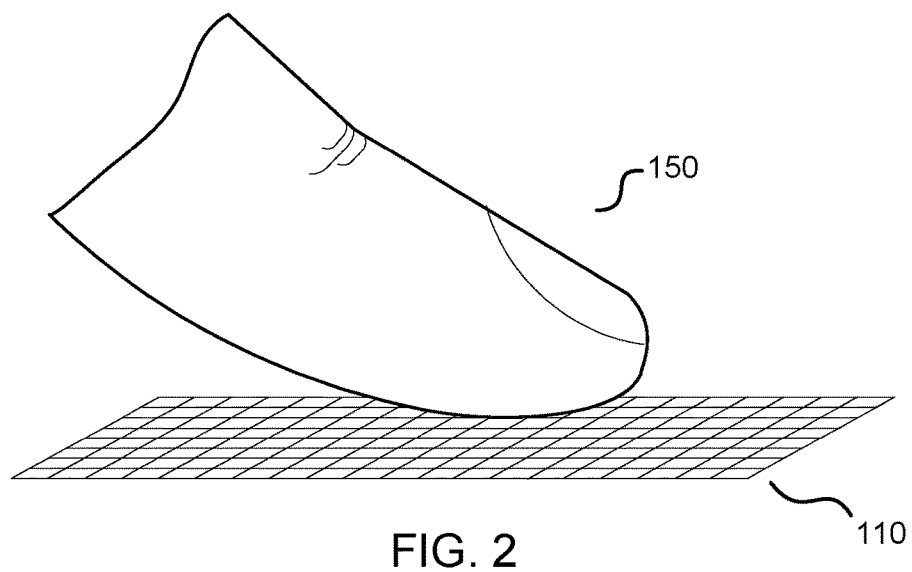
FIG. 2 illustrates a schematic representation of a pointing object with respect to a reference plane according to an embodiment.
Figure 3:
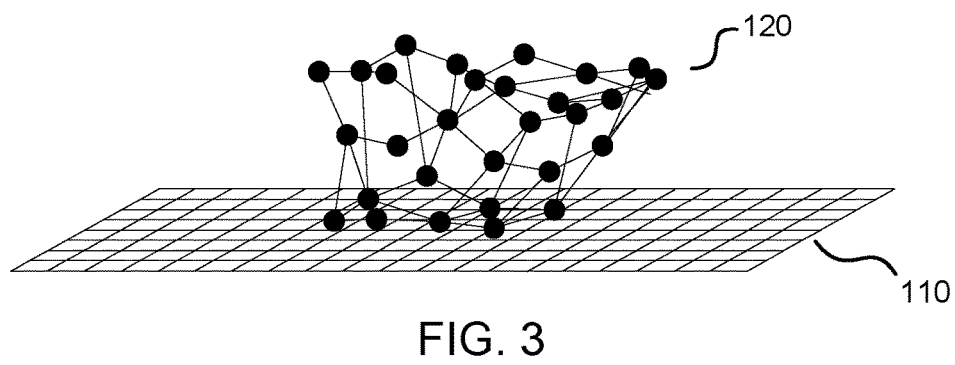
FIG. 3 illustrates a point cloud representing a pointing object, according to an embodiment.
Figure 4:
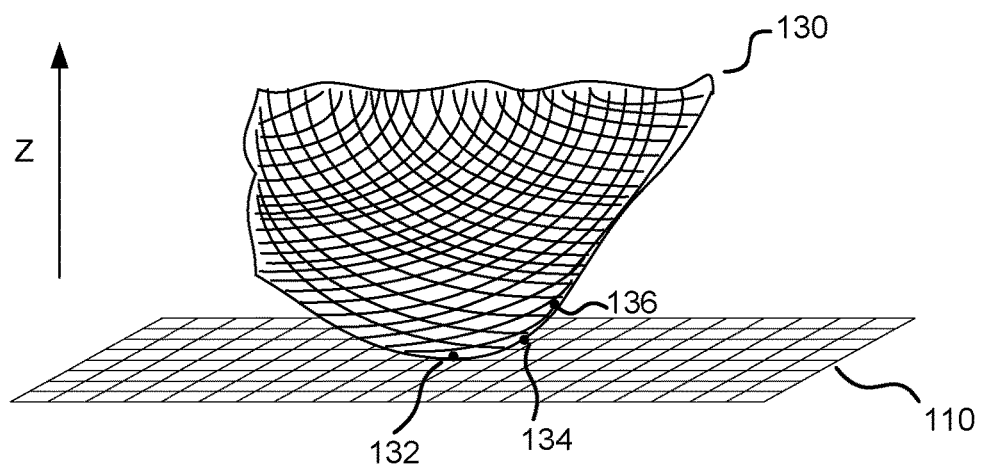
FIG. 4 illustrates a non-uniform B-spline, NURBS, surface based on control points selected from a point cloud representing a pointing object, according to an embodiment.

FIGS. 2, 3, 4 and 5 illustrate the development of a NURBS surface 130 representing a finger 150 and determination of the touch related parameters according to an embodiment. FIG. 2 illustrates a finger 150 on a reference plane 110. The reference plane 110 may be the touch screen 106 or a plane parallel to it. The finger 150 may be either touching the surface of a touch screen 106 or hovering over it. FIG. 3 illustrates a point cloud 120 representing the finger 150. Point cloud 120 may be obtained by various means and mathematical techniques depending upon the design and technology used in touchscreen 106. FIG. 4 illustrates a NURBS surface 130 representing the finger 150 on the reference plane 110.

Referring to FIG. 4, the NURBS surface 130 may be developed by the processor 102 by selecting a set of points from the point cloud 120 of FIG. 3 as control points of a NURBS surface 130. The NURBS surface 130 may be represented mathematically as $S(u, v) = \Sigma_{i=0}^{n} \Sigma_{j=0}^{m} P_{i,j} B_i^p(u) B_j^p(v)$; where $S(u, v)$ is the surface, $P_{i,j}$ are the control points $B_i^p(u)$ and $B_j^p(v)$ are pth order B-splines. According to an embodiment, p may be selected as 4. Processor 102 may implement Newton's iterative method on the surface points constituting the surface $S(u,v)$ to find an extreme point 132 in the z direction (direction perpendicular to reference plane 110). This extreme point 132 may be nearest to the touch screen 106.

Referring to FIG. 4, processor 102 may find a point 136 on the NURBS surface 130 where the Gaussian curvature of the surface has a maximum value. The processor may report a point 134 in between the point 132 closest to the touch screen 106 and the point 136 where the Gaussian curvature has a maximum value as the location of a touch or hovering action by a user.

Referring to FIG. 4, at the point closest to the touch screen 132, the processor 102 may form a matrix second order derivatives of the z-component of the surface at the point 132. The matrix of derivatives so obtained may be represented as:

$$H_{uv} = \begin{bmatrix} \frac{\partial^2 z}{\partial u^2} & \frac{\partial^2 z}{\partial u \partial v} \\ \frac{\partial^2 z}{\partial u \partial v} & \frac{\partial^2 z}{\partial v^2} \end{bmatrix}$$

where the function $z(u,v)$ is the z-component of the NURBs surface 130 represented as $S(u,v)$. Further processor 102 may calculate eigenvalues and the corresponding eigenvectors of the matrix. The processor 102 may report the azimuthal angle 151 and direction 153 of the finger 150, for example based on the eigenvector corresponding to the larger eigenvalue of the finger 150. The azimuthal angle 151 being the same as angle of the eigenvector corresponding to the larger eigenvalue. The direction 153 reported depending on the sign of the dot product of gradient of Gaussian curvature with the eigenvector corresponding to the larger eigenvalue. Further the processor 102 may calculate the elevation angle 152 by calculating a ratio of the eigenvalues with ratios closer to 1 meaning smaller angles of elevation. Based on the ratio and a conversion factor, processor 102 may report an angle of elevation 152 of the finger 150.

The matrix $H_{uv}$ defined above is not the only possible matrix from whose eigenvectors and eigenvalues similar information may be deduced for representing the pointing object 150 azimuth 151 and elevation 152 angle. According to an embodiment, surface principal curvatures, both magnitudes and directions, at the lowest point of the surface may be used as well, which the eigenvectors and eigenvalues of this matrix attempts to approximate. For example, a matrix $$H_{xy} = \begin{bmatrix} \frac{\partial^2 z}{\partial x} & \frac{\partial^2 z}{\partial x \partial y} \\ \frac{\partial^2 z}{\partial x \partial y} & \frac{\partial^2 z}{\partial y^2} \end{bmatrix}$$

may be chosen, wherein the function z(x,y) is the z-component of the NURBS surface S(u,v) expressed in terms of the global x,y,z-coordinate system.

It should be noted that even though in the present embodiments, a finger 150 is used to illustrate hovering or touching action, this is for illustration purposes only and in no way intended as a limitation. According to an embodiment, the touching or hovering action may be performed by another bodily appendage. According to an embodiment, the touching or hovering action may be performed by a non-biological pointing object such as a stylus.

Figure 5:
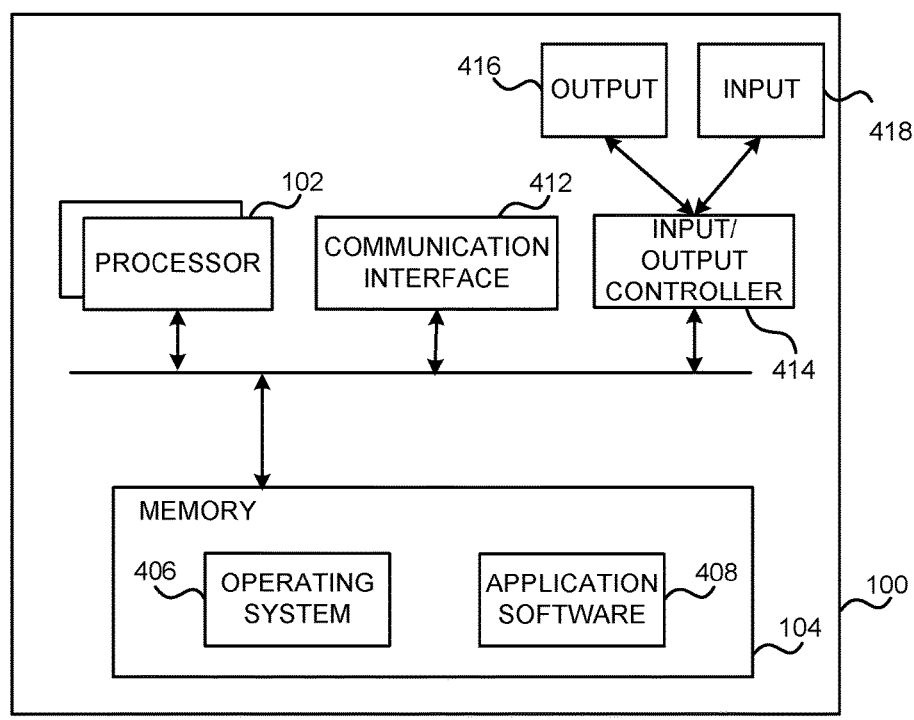
FIG. 5 illustrates the device configured to determine the pointing location, orientation and angle of elevation of the pointing object as block diagram in accordance with an embodiment.

FIG. 5 illustrates an embodiment of components of a computing device 100 which may be implemented as a form of a computing and/or electronic device. The computing device 100 comprises one or more processors 102 which may be microprocessors, controllers or any other suitable type of processors for processing computer executable instructions to control the operation of the apparatus 100. Platform software comprising an operating system 406 or any other suitable platform software may be provided on the apparatus to enable application software 408 to be executed on the device 100.

Computer executable instructions may be provided using any computer-readable media that are accessible by the device 100. Computer-readable media may include, for example, computer storage media such as a memory 104 and communications media. Computer storage media, such as a memory 104, include volatile and non-volatile, removable and non-removable media implemented in any method or technology for storage of information such as computer readable instructions, data structures, program modules. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Although the computer storage medium (the memory 104) is shown within the device 100, it will be appreciated, by a person skilled in the art, that the storage may be distributed or located remotely and accessed via a network or other communication link (e.g. using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, e.g. a locally connected printing device. According to an embodiment, touchscreen 106 may be connected to the input/output controller 414. According to an embodiment, touchscreen 106 may be connected directly to a bus connecting other components. According to an embodiment, the processor 102 executes the instructions contained in the storage 104 to carry out the functionality as described in embodiments of FIG. 1 to FIG. 4. According to an embodiment, processors 102 may be a discrete processor dedicated to determining and reporting touch, hover and related actions to other components and processor of the device 100. According to an embodiment, storage 104 may be different from other storage either logically or physically.

The functionality described herein can be performed, at least in part, by one or more hardware logic components. According to an embodiment, the computing device 100 is configured by the program code 406,408 when executed by the processor 102 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 6:
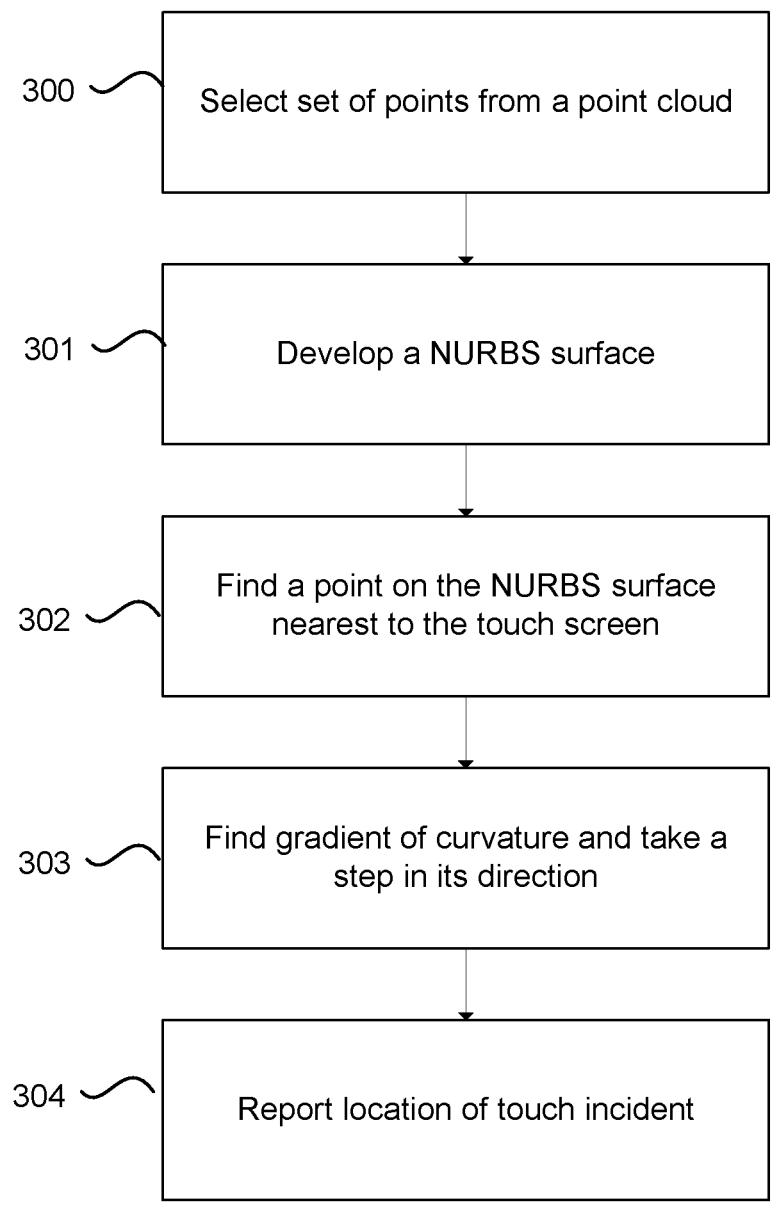
FIG. 6 illustrates as a schematic flow chart a method of finding the location of a touching or hovering action according to an embodiment.

FIG. 6 illustrates, as a schematic flow chart, a method of finding an intended touch location in accordance with an embodiment. Referring to FIG. 6, according to an embodiment the process may comprise operations 300, 301, 302, 303 and 304. According to an embodiment, the processes of FIG. 6 and/or FIG. 7 may be compiled into the program code 406,408 or stored as firmware in 104.

Operation 300 may include selecting a set of points 120 from a point cloud representing a pointing object. The pointing object represented by the point cloud 120 may be either in contact with the touch screen 106 or hovering close to the touch screen 106. The pointing object may be a human appendage, such as a finger 150 or a thumb or it may be an apparatus designed for the purpose, such as an active stylus or a passive stylus.

Operation 301 may include using the points selected in operation 300 as control points for developing a NURBS surface 130, such that the NURBS surface 130 represents the pointing object.

Operation 302 may include finding a point 132 on the NURBS surface 130 which is nearest to the touch screen 106. This may be accomplished, for example, by using Newton's iterative method.

Operation 303 may include finding the gradient of curvature of the NURBS surface 130 and from the point 132 found in step 303 moving one step in the direction of this gradient of curvature. The curvature considered may be the Gaussian curvature of the NURBS surface 130. The size of the operation in the direction of gradient of curvature may be chosen by manually or learnt over time or by calibration of the touch screen 106.

Operation 304 may include reporting the point 134 found in the operation 303 as the location of a touch incident.

Figure 7:
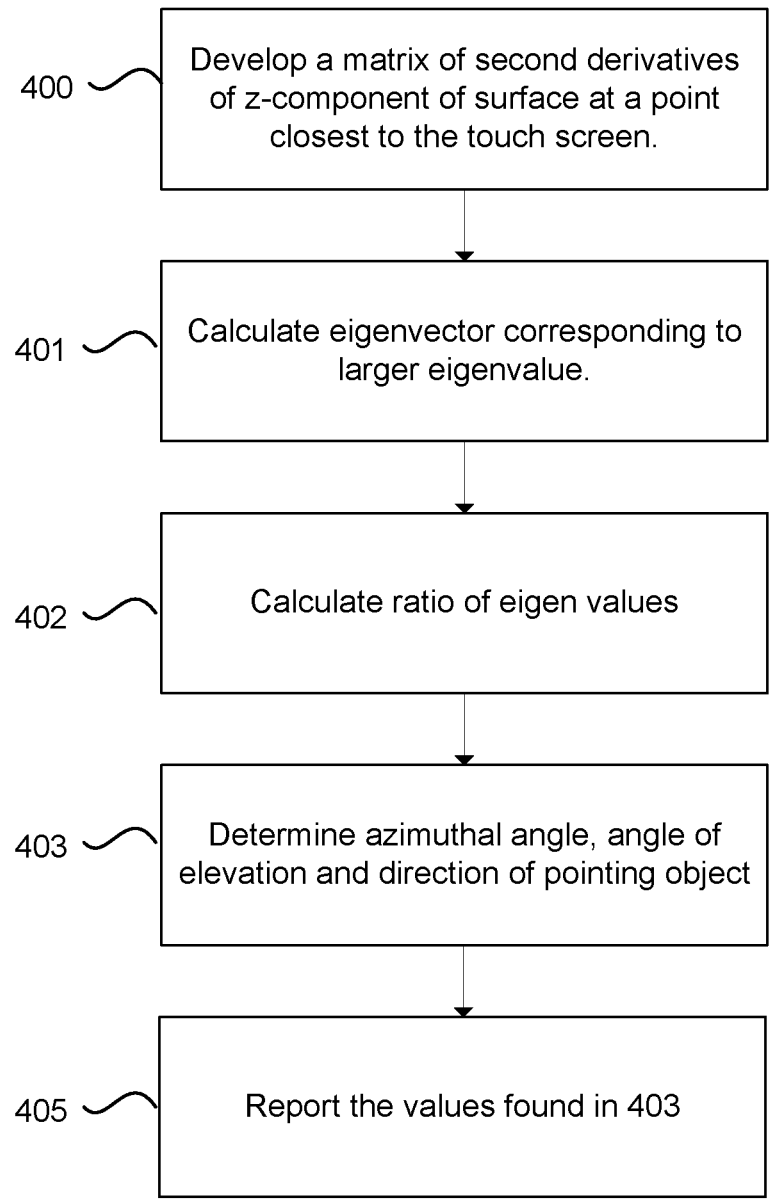
FIG. 7 illustrates a schematic flow chart a method of finding the orientation and angle of elevation of a pointing object.

FIG. 7 illustrates a method of finding the orientation and angle of elevation of a pointing object hovering over or pointing a touch screen 106 given a NURBS surface 130 representing the pointing object, a point 132 on the NURBS surface 130 nearest to the touch screen 106 and gradient of Gaussian curvature of the NURBS curve. According to an embodiment, the method may comprise operations 400, 401, 402, and 403.

Referring FIG. 7, operation 400 may include developing a matrix of second derivatives of the z-component of the surface at the point 132 closest to the touch screen 106.

Operation 401 may include calculating an eigenvector of the matrix obtained in operation 400 corresponding to the larger eigenvalue.

Operation 402 may include calculating a ratio of the eigenvalues of the matrix of the operation 400.

Operation 403 may include calculating an azimuthal angle 151 and an angle of elevation 152 of the pointing object. The azimuthal angle 151 may be the angle of eigenvector obtained in operation 401. The direction 153 may be obtained by utilizing sign of the dot product of the eigenvector and gradient of curvature. The angle of elevation 152 may be calculated from the ratio of eigenvalues obtained in operation 400. A conversion factor may be used to convert the ratio into an angle.

Operation 404 may include reporting the direction 153 of the pointing object, azimuthal angle 151 and the angle of elevation 151 obtained in operation 403.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for determining the touch or hover action. For example, the elements illustrated in FIG. 1 constitute exemplary means for pointing an object, exemplary means for displaying, exemplary means for selecting points representing the pointing object, exemplary means for processing the points, exemplary means for reporting the point, and exemplary means for performing an action accordingly.

According to an embodiment, means for selecting a set of points from a point cloud representing a pointing object in proximity or in contact of the touch screen; means for using the selected set of points as control points of a non-uniform rational B-spline, NURBS, surface representing the pointing object; means for determining a point nearest to the touch-screen on the NURBS surface; based on the point nearest to the touchscreen, means for determining a point in a direction of a gradient of a curvature of the NURBS surface; means for calculating a matrix of second derivatives of the z-component of the surface at the point nearest to the touchscreen; means for calculating an azimuthal angle from the eigenvector and dot product of the eigenvector with the gradient of curvature; means for calculating a ratio of eigenvalues of the matrix; means for calculating an angle of elevation of the pointing object based on the ratio; means for reporting the point in the direction of a gradient of a curvature of the NURBS surface as a location of a pointing or a touch action, the azimuthal angle, angle of elevation; and means for performing an action in response to the reports, the action being based on at least one of location of the pointing or touch action, orientation of the pointing object, and the angle of elevation.

According to an embodiment a device, comprises: a display;

a processor; a storage containing instructions; wherein the instructions cause the processor to: select a set of points from a point cloud representing a pointing object in proximity or in contact of the display; determine the selected set of points as control points of a computational smooth surface representing the pointing object; determine a point nearest to the display on the computational smooth surface; based on the point nearest to the display, determine a point in a direction of a gradient of a curvature of the computational smooth surface; and report the point as a location of a desired pointing or touch action.

Alternatively or in addition to the above, the computational smooth surface comprises a non-uniform rational B-spline, NURBS, surface.

Alternatively or in addition to the above, the NURBS surface comprises a 4th order NURBS surface.

Alternatively or in addition to the above, the location is reported as a tip of the pointing object to at least one of an application, an operating system, or a processor.

Alternatively or in addition to the above, the storage contains instructions which further cause the processor to: calculate a matrix of second derivatives of the z-component of the computational smooth surface at the point nearest to the display; calculate an eigenvector which corresponds to the largest eigenvalue of the matrix; calculate an angle from the eigenvector and dot product of the eigenvector with the gradient of curvature; and report the angle as azimuthal angle of the pointing object.

Alternatively or in addition to the above, the angle is reported as an orientation to at least one of an application, an operating system, and a processor Alternatively or in addition to the above, the storage contains instructions which further cause the processor to: calculate a ratio of eigenvalues of the matrix; calculate an angle of elevation of the pointing object based on the ratio; and report the angle of elevation.

Alternatively or in addition to the above, the angle of elevation is reported to at least one of an application, an operating system, and a processor.

Alternatively or in addition to the above, the display comprises at least one of a capacitive touchscreen, a resistive touchscreen, an optical imaging based touchscreen, inductive touch screen and an ultrasound based touch screen.

Alternatively or in addition to the above, the pointing object comprises a human appendage such as a finger.

Alternatively or in addition to the above, the pointing object comprises a touching or pointing apparatus.

Alternatively or in addition to the above, determination of the point closest to the display comprises using Newton's iterative method.

Alternatively or in addition to the above, the determining a gradient of curvature of the computational smooth surface comprises determining a gradient of Gaussian curvature of a NURBS surface.

Alternatively or in addition to the above, the storage contains instructions which cause the processor to perform or make the device perform an action in response to a report containing the location.

Alternatively or in addition to the above, the set of instructions is executed in real-time and cause the processor to perform the instruction in the real-time.

According to an embodiment, a device, comprises: a touch sensitive element; a processor; a storage comprising a set of instructions; and wherein the set of instructions is executed in and causes the processor to: select a set of points from a point cloud representing a pointing object in proximity or in contact of the touch sensitive element; use the selected set of points as control points of a non-uniform rational B-spline, NURBS, surface representing the pointing object; determine a point nearest to the touch sensitive element on the NURBS surface; based on the point nearest to the touch sensitive element, determine a point in a direction of a gradient of a curvature of the NURBS surface; calculate a matrix of second derivatives in the z-direction at the point nearest to the touch sensitive element; calculate an azimuthal angle from the eigenvector and dot product of the eigenvector with the gradient of curvature; calculate a ratio of eigenvalues of the matrix; calculate an angle of elevation of the pointing object based on the ratio; report the point in the direction of a gradient of a curvature of the NURBS surface as a location of a pointing or a touch action, the azimuthal angle, angle of elevation; and perform an action in response to the reports, the action being based on at least one of location of the pointing or touch action, orientation of the pointing object, and the angle of the elevation.

Alternatively or in addition to the above, the pointing object comprises one of a human appendage, an active stylus, or passive stylus.

According to an embodiment a method comprises: selecting a set of points from a point cloud representing a pointing object in proximity or in contact of a screen; using the selected points as control points of a computational smooth surface representing the pointing object; determining a point nearest to the screen on the computational smooth surface; determining a point in a direction of a gradient of a curvature of the computational smooth surface from the point nearest to the screen; and reporting the point as a location of a hover or a touch action.

Alternatively or in addition to the above, further comprising: calculating a matrix of second derivatives of the z-component of the computational smooth surface at the point nearest to the screen; calculating an eigenvector which corresponds to the larger eigenvalue of the matrix; calculate an angle from the eigenvector and dot product of the eigenvector with the gradient of curvature; and reporting the angle as azimuthal angle of the pointing object.

Alternatively or in addition to the above, further comprising: calculating a ratio of eigenvalues of the matrix; calculating an angle of elevation of the pointing object based on the ratio; and reporting the angle of elevation.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a display;
a processor;
a storage containing instructions;
wherein the instructions cause the processor to:
    develop a point cloud representing a pointing object in proximity to or in contact with the display;
    select a set of points from the point cloud;
    determine the selected set of points as control points of a computational smooth surface representing the pointing object;
    determine a point nearest to the display on the computational smooth surface;
    based on the point nearest to the display, determine a point in a direction of a gradient of a curvature of the computational smooth surface; and
    report the point as a location of a desired pointing or touch action.

2. The device of claim 1, wherein the computational smooth surface comprises a non-uniform rational B-spline, NURBS, surface.

3. The device of claim 2, wherein the NURBS surface comprises a 4$^{th}$ order NURBS surface.

4. The device of claim 1 wherein the location is reported as a tip of the pointing object to at least one of an application or an operating system.

5. The device of claim 1 wherein the storage contains instructions which further cause the processor to:
    calculate a matrix of second derivatives of the z-component of the computational smooth surface at the point nearest to the display;
    calculate an eigenvector which corresponds to the largest eigenvalue of the matrix;
    calculate an angle from the eigenvector and dot product of the eigenvector with the gradient of curvature; and
    report the angle as azimuthal angle of the pointing object.

6. The device of claim 5, wherein the angle is reported as an orientation to at least one of an application or an operating system.

7. The device of claim 5, wherein the storage contains instructions which further cause the processor to:
    calculate a ratio of eigenvalues of the matrix;
    calculate an angle of elevation of the pointing object based on the ratio; and
    report the angle of elevation.

8. The device of claim 7, wherein the angle of elevation is reported to at least one of an application or an operating system.

9. The device of claim 1, wherein the display comprises at least one of a capacitive touchscreen, a resistive touchscreen, an optical imaging based touchscreen, inductive touch screen and an ultrasound based touch screen.

10. The device of claim 1, wherein the computational smooth surface comprises a convex surface.

11. The device of claim 1, wherein the pointing object comprises a touching or pointing apparatus.

12. The device of claim 1, wherein determination of the point closest to the display comprises using Newton's iterative method.

13. The device of claim 1, wherein the determining a gradient of curvature of the computational smooth surface comprises determining a gradient of Gaussian curvature of a NURBS surface.

14. The device of claim 1, wherein the storage contains instructions which cause the processor to perform or make the device perform an action in response to a report containing the location.

15. The device of claim 1, wherein the instructions is executed in real-time and cause the processor to perform the instruction in the real-time.

16. A device, comprising:
a touch sensitive element;
a processor;
a storage comprising a set of instructions; and
wherein the set of instructions is executed in and causes the processor to:
    develop a point cloud representing a pointing object in proximity to or in contact with the touch sensitive element;
    select a set of points from the point cloud;
    use the selected set of points as control points of a non-uniform rational B-spline, NURBS, surface representing the pointing object;
    determine a point nearest to the touch sensitive element on the NURBS surface;
    based on the point nearest to the touch sensitive element, determine a point in a direction of a gradient of a curvature of the NURBS surface;
    calculate a matrix of second derivatives in the z-direction at the point nearest to the touch sensitive element;
    calculate an azimuthal angle from an eigenvector and dot product of the eigenvector with the gradient of curvature;
    calculate a ratio of eigenvalues of the matrix;
    calculate an angle of elevation of the pointing object based on the ratio;
    report the point in the direction of a gradient of a curvature of the NURBS surface as a location of a pointing or a touch action, the azimuthal angle, angle of elevation; and
    perform an action in response to the report, the action being based on at least one of location of the pointing or touch action, orientation of the pointing object, and the angle of the elevation.

17. The device of claim 16, wherein the pointing object comprises one of a human appendage, an active stylus, or passive stylus.

18. A method, comprising:
developing a point cloud representing a pointing object in proximity to or in contact with a screen;
selecting a set of points from the point cloud;
using the selected points as control points of a computational smooth surface representing the pointing object;
determining a point nearest to the screen on the computational smooth surface;
determining a point in a direction of a gradient of a curvature of the computational smooth surface from the point nearest to the screen; and
reporting the point as a location of a hover or a touch action.

19. The method of claim 18, further comprising:
calculating a matrix of second derivatives of the z-component of the computational smooth surface at the point nearest to the screen;
calculating an eigenvector which corresponds to the larger eigenvalue of the matrix;
calculating an angle from the eigenvector and dot product of the eigenvector with the gradient of curvature; and
reporting the angle as azimuthal angle of the pointing object.

20. The method of claim 19, further comprising:
calculating a ratio of eigenvalues of the matrix;
calculating an angle of elevation of the pointing object based on the ratio; and
reporting the angle of elevation.

* * * * *